(12) United States Patent
Kim et al.

(10) Patent No.: US 9,799,869 B2
(45) Date of Patent: Oct. 24, 2017

(54) MICROPOROUS POLYOLEFIN COMPOSITE FILM HAVING EXCELLENT HEAT RESISTANCE AND THERMAL STABILITY AND METHOD FOR MANUFACTURING THE SAME

(71) Applicant: SK Innovation Co., Ltd., Seoul (KR)

(72) Inventors: Yong Kyoung Kim, Daejeon (KR); Jae Woong Kim, Daejeon (KR); Young Jun Woo, Daejeon (KR); Jang-Weon Rhee, Daejeon (KR); Dong Jin Joo, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 56 days.

(21) Appl. No.: 14/377,318

(22) PCT Filed: Feb. 7, 2013

(86) PCT No.: PCT/KR2013/000994
§ 371 (c)(1),
(2) Date: Aug. 7, 2014

(87) PCT Pub. No.: WO2013/119056
PCT Pub. Date: Aug. 15, 2013

(65) Prior Publication Data
US 2015/0004467 A1 Jan. 1, 2015

(30) Foreign Application Priority Data
Feb. 8, 2012 (KR) .................. 10-2012-0012753

(51) Int. Cl.
*H01M 2/16* (2006.01)
*C08J 5/18* (2006.01)
(Continued)

(52) U.S. Cl.
CPC ............. *H01M 2/1686* (2013.01); *C08J 5/18* (2013.01); *H01M 2/145* (2013.01); *H01M 2/166* (2013.01);
(Continued)

(58) Field of Classification Search
None
See application file for complete search history.

(56) References Cited

U.S. PATENT DOCUMENTS 5,741,608 A  4/1998 Kojima et al.
6,423,449 B1 * 7/2002 Hong .................. H01M 2/18
                                              429/129

(Continued)

FOREIGN PATENT DOCUMENTS

CN  101088183 A  12/2007
JP  5174863 A    7/1993
(Continued)

*Primary Examiner* — Miriam Stagg
*Assistant Examiner* — Wojciech Haske
(74) *Attorney, Agent, or Firm* — The Webb Law Firm

(57) ABSTRACT

The following disclosure relates to a microporous polyolefin composite film having excellent heat resistance and thermal stability, and a method for manufacturing the same. More particularly, the present invention relates to a microporous polyolefin composite film capable of improving stability and reliability of a battery by heat sealing an edge of a microporous film provided with a coating layer that includes a polymer binder and inorganic particles, and a method for manufacturing the same.

7 Claims, 3 Drawing Sheets (a)

(b)

(51) Int. Cl.
  *H01M 2/14* (2006.01)
  *H01M 2/18* (2006.01)
  *H01M 2/02* (2006.01)
  *H01M 10/052* (2010.01)
  *H01M 10/058* (2010.01)

(52) U.S. Cl.
  CPC ....... *H01M 2/1646* (2013.01); *H01M 2/1653* (2013.01); *H01M 2/1673* (2013.01); *H01M 2/18* (2013.01); *C08J 2323/02* (2013.01); *H01M 2/0267* (2013.01); *H01M 2/0275* (2013.01); *H01M 10/052* (2013.01); *H01M 10/058* (2013.01)

(56) References Cited

U.S. PATENT DOCUMENTS

| | | |
|---|---|---|
| 7,662,517 B2 | 2/2010 | Lee et al. |
| 8,195,097 B2 | 6/2012 | Ji et al. |
| 2002/0160257 A1 | 10/2002 | Lee et al. |
| 2008/0096102 A1 | 4/2008 | Hatayama et al. |
| 2009/0087728 A1 | 4/2009 | Less et al. |
| 2010/0216027 A1 | 8/2010 | Fujii |
| 2011/0027642 A1 | 2/2011 | Lee et al. |
| 2011/0195298 A1 | 8/2011 | Daidoji et al. |
| 2012/0034509 A1 | 2/2012 | Bae et al. |

FOREIGN PATENT DOCUMENTS

| | | |
|---|---|---|
| KR | 1020030065074 A | 8/2003 |
| KR | 1020060042325 A | 5/2006 |
| KR | 1020060072065 A | 6/2006 |
| KR | 1020090051085 A | 5/2009 |
| KR | 1020090107442 A | 10/2009 |
| WO | 2009026467 A1 | 2/2009 |
| WO | 2010027203 A2 | 3/2010 |

\* cited by examiner

[Figure 1]
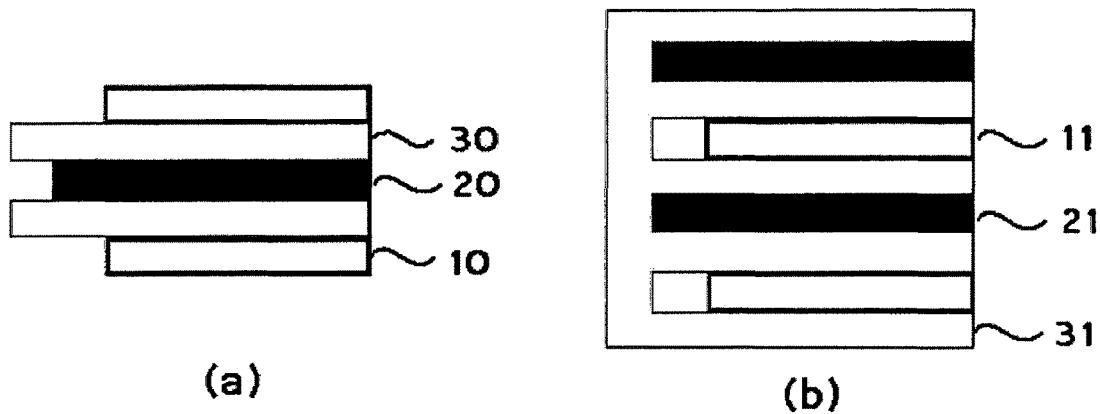
(a) (b)

[Figure 2]
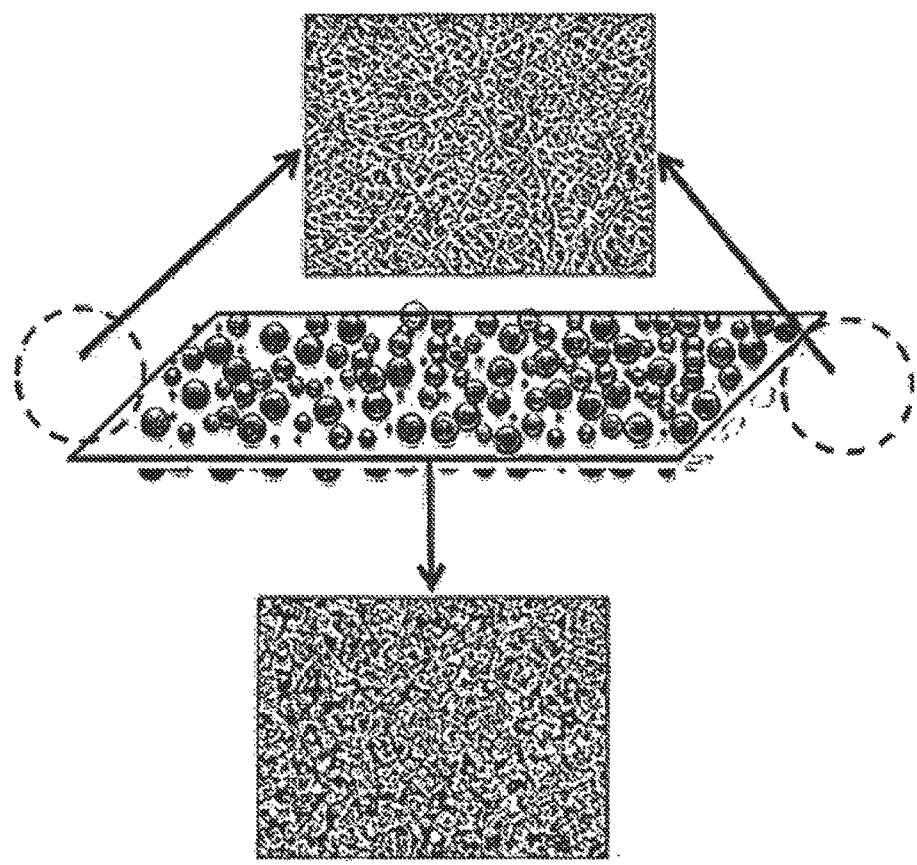

[Figure 3]
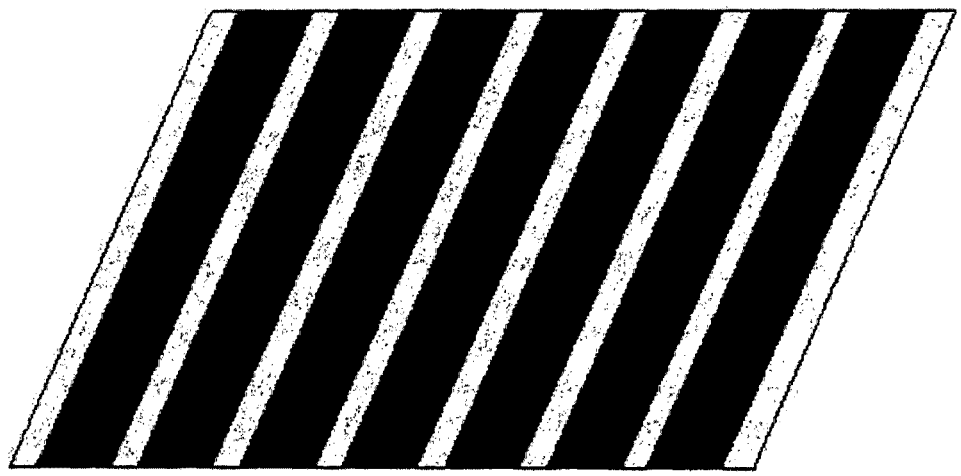

MICROPOROUS POLYOLEFIN COMPOSITE FILM HAVING EXCELLENT HEAT RESISTANCE AND THERMAL STABILITY AND METHOD FOR MANUFACTURING THE SAME

CROSS-REFERENCE TO RELATED APPLICATIONS

This application is the United States national phase of International Application No. PCT/KR2013/000994 filed Feb. 7, 2013, and claims priority to Korean Patent Application No. 10-2012-0012753 filed Feb. 8, 2012, the disclosures of which are hereby incorporated in their entirety by reference.

TECHNICAL FIELD

The following disclosure relates to a microporous polyolefin composite film having excellent heat resistance and thermal stability and a method for manufacturing the same. More particularly, the following disclosure relates to a microporous polyolefin composite film capable of improving stability, reliability, and durability of a battery by heat sealing an edge of a microporous polyolefin composite film provided with a coating layer that includes a polymer binder and inorganic particles, and a method for manufacturing the same.

BACKGROUND ART

A microporous polyolefin film has been widely used as a battery separator, a separation filter, micro-filtration membrane, and the like, due to chemical stability and excellent characteristics thereof. Among them, a secondary battery separator has high ion transport capacity through inner pores in addition to a function of spatial separation function between a cathode and an anode. Recently, in accordance with high capacitance and high output of the secondary battery, as one of a method for improving electric stability of the battery, a demand for improving the characteristics of the microporous film has increased. In the case of a lithium secondary battery, when thermal stability of the microporous polyolefin film is reduced, a short between electrodes may be generated together with damage or deformation of the microporous film due to temperature increase generated from abnormal behavior of the battery, and a risk of overheating, ignition, or explosion of the battery may be present.

Recently, under a condition requiring high output/high capacitance of the battery such as an information technology (IT), an electric drive vehicle (EDV), an electric power tool, an energy storage system (ESS), or the like, since ignition possibility and explosion possibility generated at the time of abnormal behavior of the battery may be several times to several ten times higher than those of the existing battery, thermal stability at a high temperature capable of handling the temperature increase of the battery has been urgently required.

In order to solve a thermal stability problem as described above, a method of forming a porous film using a polymer binder and inorganic particles giving heat-resistance property at least one surface of the microporous polyolefin film was used, and research into a technology of improving stability of the battery simultaneously with improving thermal shrinkage at high temperature has been conducted.

In addition, in the case in which the electric power tool or the vehicle using the high output/high capacitance battery, the electric power tool or the vehicle may be frequently exposed to severe vibration and impact while in use, and in a structure of the existing battery, shaking of an electrode plate may be generated by vibration and impact in a vertical direction. Therefore, friction between the electrode plate and the microporous film may be generated or the electrode plate may protrude out of the microporous film. In the case in which this phenomenon is accumulated or severe, an internal short may be generated to cause ignition and explosion. Further, the plate may be repeatedly shrunk and expanded whenever the battery is charged and discharged, but since degrees of shrinkage and expansion are different according to a coating state of an active material of each portion of the electrode plate and impregnation state of an electrolyte solution, the electrode plate may be warped in the case in which the battery is frequently charged and discharged or under over-charge or over-discharge environment. As a result, a possibility of generation of the internal short may be further increased due to the problem such as deviation of the electrode with respect to the microporous film, or the like. Therefore, stability and reliability of the battery may not be sufficiently secured only by simply improving the thermal shrinkage of the microporous polyolefin film at high temperature.

A porous composite separator including inorganic particles was disclosed in International Patent Laid-Open Publication No. WO 09/026,467 (Patent Document 1), but it may be difficult to uniformly impregnate and completely dry a solvent due to characteristics of a process of adhering the separator and an electrode coating layer using the solvent. In addition, in the case of adhesion by heat, since it may be difficult to uniformly adhere all of areas of the electrode and separator to each other, wrinkles may be easily generated in the battery. These problems cause deterioration of battery performance and productivity. A separator coated with a first adhesive polymer and a second functional polymer was disclosed in Korean Patent Laid-Open Publication No. 2004-0090935 (Patent Document 2), but it may be difficult to improve stability of the battery only by using the polymer having an adhesive property and functionality in abnormal behavior of the battery in which an internal temperature of the battery rapidly increases, such as overcharge, penetration, heat exposure except for vibration and impact.

As described above, according to the existing technology, it may be difficult to implement a separator capable of significantly improving stability of a battery against vibration and impact simultaneously with improving thermal shrinkage at high temperature.

RELATED ART DOCUMENT

Patent Document (Patent Document 1) International Patent Laid-Open Publication No. WO 09/026,467
(Patent Document 2) Korea Patent Laid-Open Publication No. 2004-0090935

DISCLOSURE OF INVENTION

Technical Problem

An embodiment of the present invention is directed to providing a microporous polyolefin composite film capable of significantly improving stability and reliability of a battery by forming a coating layer including a high heat resistant polymer binder and inorganic particles to control shrinkage of the microporous film and forming an electrode and the microporous film in a single package through heat sealing of the microporous polyolefin composite film.

In addition, another embodiment of the present invention is directed to providing an electro-chemical device including the microporous polyolefin composite film.

Solution to Problem

In one general aspect, there is provided a microporous polyolefin composite film including a coating layer that includes a polymer binder and inorganic particles on one surface or both surfaces of a microporous polyolefin film, wherein the coating layer is formed to be spaced apart from an edge line of the microporous polyolefin film by a predetermined width, and a portion of the spaced portion is heat sealed.

In another general aspect, there is provided a method for manufacturing a microporous polyolefin composite film including: (a) manufacturing a microporous polyolefin film; (b) preparing a coating solution including a polymer binder and inorganic particles; (c) applying the coating solution prepared in step (b) on one surface of the microporous polyolefin film manufactured in step (a) except for a portion of an edge of the microporous polyolefin film; and (d) heat sealing the portion of the edge of the microporous film.

Advantageous Effects of Invention

According to the present invention, a microporous polyolefin composite film capable of significantly improving stability, reliability, and durability of a battery by forming a coating layer including a polymer binder and inorganic particles to control shrinkage of the microporous film and forming an electrode and the microporous film in a single package through thermal fusion of the microporous polyolefin composite film may be provided.

BRIEF DESCRIPTION OF DRAWINGS

FIG. 1A is a view showing a configuration of a cell of an electro-chemical device according to the related art, and FIG. 1B is a view showing a configuration of a cell of an electro-chemical device according to an exemplary embodiment of the present invention;

FIG. 2 is a view and an electron microscope photograph of a microporous polyolefin composite film according to the exemplary embodiment of the present invention; and FIG. 3 is a view schematically showing a microporous polyolefin composite film manufactured by the method (a continuous process) according to the exemplary embodiment of the present invention.

DETAILED DESCRIPTION OF MAIN ELEMENTS

10: Cathode of secondary battery according to the related art
20: Anode of secondary battery according to the related art
30: Microporous film of secondary battery according to the related art
11: Cathode of the present invention
21: Anode of the present invention
31: Microporous film of the present invention

MODE FOR THE INVENTION

Hereinafter, exemplary embodiment of a microporous polyolefin composite film and a method for manufacturing the same according to the exemplary embodiment of the present invention, and evaluation test items thereof will be described in detail. Hereinafter, the present invention will be understood and appreciated more specifically from the following embodiments, and the embodiments are for illustrating the present invention and not for limiting the present invention defined by the accompanying claims.

The present invention provides a microporous polyolefin composite film including a coating layer that includes a polymer binder and inorganic particles on one surface or both surfaces of the microporous polyolefin film, wherein the coating layer is formed to be spaced apart from an edge line of the microporous polyolefin film by a predetermined width, and the spaced portion includes a heat sealing section.

The microporous polyolefin composite film according to the exemplary embodiment of the present invention is characterized in that it is configured of a coating layer capable of giving heat-resistance to a portion contacting at least one of both electrode plates, and an outer edge of the electrode plate is heat sealed. In this case, the fused portion may include a portion at which a tap is present in a vertical direction, an area of the coating layer may be 100 to 150% of an area of an anode plate, and the heat sealing section may have a width of 0.5 to 50 mm from the edge line of the microporous polyolefin film. In addition, the heat sealing section may be partially or entirely heat sealed with an aluminum pouch.

Preferably, a heat sealing temperature of the microporous polyolefin composite film may be 140 to 280° C., a heat sealing time thereof may be 1 to 20 seconds, and a heat sealing pressure thereof may be 0.1 to 2 MPa.

In the microporous polyolefin composite film, preferably, a shrinkage ratio in machine/transverse direction at 160° C. may be 10% or less, a melt fracture temperature may be 190° C. or more, adhesive force between the coating layer and the microporous polyolefin film may be 1.0 $Kg_f/cm^2$ or more, and gas permeability (Gurley) may be in a range of 30 to 1000 seconds.

In addition, the present invention provides a method for a microporous polyolefin composite film including:

(a) manufacturing a microporous polyolefin film; (b) preparing a coating solution including a polymer binder and inorganic particle; (c) applying the coating solution prepared in step (b) on one surface of the microporous polyolefin film manufactured in step (a) except for a portion of an edge of the microporous polyolefin film; and (d) heat sealing the portion of the edge of the microporous polyolefin film.

Hereinafter, the present invention will be described in more detail.

The microporous polyolefin composite film according to the exemplary embodiment of the present invention includes the coating layer including a polymer binder and inorganic particles on one surface or both surfaces of the microporous polyolefin film, wherein the coating layer is formed to be spaced apart from an edge line of the microporous polyolefin film by a predetermined width, and the spaced portion is partially or entirely heat sealed.

The microporous polyolefin film may be manufactured by melting/kneading/extruding a polyolefin resin and diluents in a sheet shape, wherein a weight ratio of the polyolefin resin to the diluent may be 15 to 50:85 to 50. In the case in which the weight ratio of the polyolefin resin is smaller than 15, it may not be easy to form a uniform sheet due to an excessive amount of the diluent having low viscosity, the sheet may not be sufficiently oriented during a stretching process, such that it may be difficult to secure mechanical strength, and mechanical properties of the sheet may be deteriorated to cause problems such as fracture, or the like, during the stretching process. In the case in which the weight ratio of the polyolefin resin is larger than 50, viscosity of the composition increases, such that extrudability may be deteriorated due to a load increase at the time of kneading and extruding, permeability of the microporous polyolefin film may be significantly reduced, and sheet may be hard to thereby be non-uniformly stretched.

The polyolefin resin may be preferably at least one kind of polyolefin resin alone or a mixture thereof. Particularly, it may be effective that the polyolefin resin may be at least one kind selected among polyethylene, polypropylene, poly-4-methyl-1-pentene, a copolymer thereof, or the like, that are use ethylene, propylene, α-olefin, 4-methyl-1-pentene, or the like, as a monomer and comonomer.

The microporous polyolefin composite film includes the coating layer including the polymer binder and the inorganic particles on one surface or both surfaces thereof. The polymer binder is added in order to improve heat-resistance and adhesive force of the microporous polyolefin film, and preferably, a melting point (Tm) or a glass transition temperature (Tg) of the polymer binder may be 190° C. or more.

The polymer binder included in the coating layer according to the exemplary embodiment of the present invention is not limited to a polymer generally used in the art. For example, the polymer binder may be a water soluble polymer, non-water soluble polymer, or a mixture thereof.

As the water soluble polymer, a mixture of at least one kind selected from polyvinyl alcohol, carboxymethyl cellulose, polyvinyl acetamide, polyacrylamide, polyacrylic acid, or copolymers thereof may be effectively used, but the present invention is not limited thereto. As the non-water soluble polymer, polyvinylidene fluoride and copolymers thereof, polyamide, polyamideimide, polyetherimide, polyarylate, polysulfone, polyimide, polyether sulfone, or the like, may be used. In the case in which the water soluble polymer is used, in order to improve adhesive force with the microporous polyolefin film or the inorganic particle, non-water soluble polymer may be additionally used, and as the non-water soluble polymer used in this case, there are styrene-acrylate, styrene-butadiene-acrylate, vinyl acrylate, carboxyl acrylate copolymer, or the like. These non-water soluble polymers may be used alone or together with at least one kind of water soluble polymer as a copolymer, and a mixture containing the above ingredient may be used. The non-water soluble polymer that may be used together with the water soluble polymer among the non-water soluble polymers, for example, may be used in a shape in which the polymer is water-dispersed using a spherical latex polymer having a size of several ten to several hundred nm. In this case, when water is evaporated, the polymer is adhere and stuck to the inorganic particles, or the like, thereby assisting in improving the adhesive force. In addition, since the non-water soluble polymer is water-dispersed, the non-water soluble polymer may be easily used together with the water soluble polymer.

In addition, since the inorganic particle coated together with the polymer is not deformed by external impact or force due to its rigidity or thermally deformed even at a high temperature of 200° C. or more, the inorganic particle is added in order to prevent shrinkage of the microporous polyolefin film generated at high temperature by being bonded to the polymer. Further, since the inorganic particle has a porosity of about 40 to 80% due to a structure of the particle itself, a porosity and permeability of a final product may be adjusted by adjusting a ratio of the inorganic particle to a heat resistant resin. According to the present invention, the microporous polyolefin composite film capable of maintaining high permeability and securing thermal stability may be manufactured.

The inorganic particle may preferably have an average particle size of 0.01 to 20 μm, more preferably, 0.1 to 10 μm, most preferably 0.1 to 2.0 μm. In addition, the inorganic particle may be one kind or at least two kinds selected among alumina, aluminum hydroxide, silica, barium oxide, titanium oxide, magnesium oxide, magnesium hydroxide, clay, glass powder, boehmite, or mixtures thereof, and more preferably, alumina having an alpha crystal structure may be effectively used. Particularly, alumina having the alpha crystal structure has excellent rigidity and most effectively blocks a short phenomenon by dendrite and foreign materials. In the case in which a particle crystal size is several to several ten nm but inorganic particles present in cluster form are included, such that an average size of the inorganic particle is 0.01 μm, since a specific surface area is large, in order to maintain the same adhesive force, a large amount of polymer binders should be used. Therefore, spaces between the inorganic particles are significantly reduced, such that it may be difficult to implement high thermal stability and permeability desired in the present invention. On the other hand, in the case in which the average size of the inorganic particles is 20 μm or more, the number of inorganic particles present in microporous polyolefin film per unit area is reduced to reduce a contact between the microporous polyolefin film and the inorganic particles, such that shrinkage of the microporous polyolefin film may not be effectively prevented.

The coating layer including the polymer binder and the inorganic particles described above is formed on one surface or both surfaces of the microporous polyolefin film, wherein the coating layer may be formed to be spaced apart from the edge line of the microporous polyolefin film by a predetermined width. In addition, the coating layer may have an area of 100 to 150% of that of the anode plate. When the area of the coating layer is smaller than 100% of that of the anode plate, at the time of increasing of an internal temperature of the battery, thermal shrink is generated at an uncoated portion of microporous polyolefin film, an internal short between an anode and a cathode at a portion facing the uncoated portion may not be effectively blocked. In addition, in the case in which the area of the coating layer is larger than 150% of that of the anode plate, a size of the battery inefficiently increases as compared to an electrode area, such that a ratio of capacitance to a volume of the battery may be significantly reduced.

In the coating layer, since the polymer binder has a significantly high heat resistant temperature and the inorganic particles are mixed therein, when the coating layer is heat sealed, the adhesive force may not be sufficient. Therefore, a portion for heat sealing may be uncoated or be coated with a separate binder for heat sealing.

The predetermined region (the uncoated region) at which the coating layer is not formed on one surface or both surfaces of the microporous polyolefin film is formed at a width of 0.5 to 50 mm from the edge line of the microporous polyolefin film, and it may be effective that some portion or the entire portion of the uncoated region may include heat sealing section. Although a separate adhesive material may be used for heat sealing, in this case, coating is performed using a second polymer, such that cost increases, and the used polymer may be swelled by the electrolyte solution or deformed, such that there is a limitation in improving durability by heat sealing. On the other hand, according to the present invention, the uncoated region of the microporous polyolefin is directly heat sealed, a manufacturing process may be simplified and manufacturing cost may be reduced, and durability such as adhesion at the heat sealed portion, or the like, may be improved. In addition, some portion or the entire portion of the heat sealing section may be heat sealed together with the aluminum pouch, and in this case, electrode plate assembly enclosed by the microporous film and the aluminum pouch are integrated with each other, such that stability against vibration and impact may be increased, and a heat sealing process of the microporous film and a heat sealing process of the aluminum pouch are performed at one time, such that manufacturing time and cost may be reduced.

According to the exemplary embodiment of the present invention, there is provided a microporous composite film of which a heat sealing temperature is 140 to 280° C., a heat sealing time is 1 to 20 seconds, and a heat sealing pressure is 0.1 to 2 MPa.

The microporous polyolefin composite film has a shrinkage ratio of 10% or less in the machine/transverse direction at 160° C. for 60 minutes. The shrinkage ratio in the machine/transverse direction at 160° C. indicates thermal stability of the microporous film of the battery at high temperature, and in the case in which the shrinkage ratio at 160° C. is higher than 10%, when the internal temperature of the battery increases, two electrodes are exposed to each other to causing a short between the electrodes, such that a possibility of additional ignition and explosion may be increased.

In addition, in the microporous polyolefin composite film according to the exemplary embodiment of the present invention, the melt fracture temperature may be 190° C. or more, and more preferably, 190 to 300° C. The melt fracture temperature which is a factor affecting thermal properties of a material of the microporous polyolefin film and stability in organic electrolyte solution, is an initial temperature at which fracture is observed in the microporous film by deformation such as shrinkage at high temperature. It means that the higher the melt fracture temperature, the more excellent the thermal stability, and generally, in the case of the microporous polyolefin film, the melt fracture temperature is 140 to 160° C. In the case of the existing IT products, since the capacitance and output is not high, even the microporous polyolefin film is used, stability may be sufficiently implemented. However, as a high capacitance and high output battery is gradually required, thermal stability may be significantly insufficient to use the microporous polyolefin film alone. In the microporous polyolefin composite film manufactured according to the present invention, a microporous composite film coated with the polymer binder and the inorganic particles on one surface or both surfaces is formed, such that the microporous polyolefin composite film has a high melt fracture temperature of 190° C. or more. In the case in which the melt fracture temperature is the 190° C. or less, stability against rapid temperature increase generated at the time of abnormal behavior of the battery may not be secured.

In addition, adhesive force between the coating layer and the microporous polyolefin film may be 1.0 $Kg_f/cm^2$ or more, more preferably 1.0 to 10 $Kg_f/cm^2$. The reason is that in the case in which the adhesive force is smaller than 1.0 $Kg_f/cm^2$ even though the heat resistance and thermal shrinkage are excellent, separation of the coating layer may be generated during a slitting process and a battery assembling process, such that the battery assembling process may be polluted. Defects such as pin hole in the microporous film is generated by the secondary pollution, the tertiary pollution described above, or the like, such that stability of the battery may be deteriorated. In addition, the coating layer may be damaged by continuous friction with the electrode, and thus, separation of the coating layer may be generated.

The gas permeability (Gurley) of the microporous polyolefin composite film may be in a range of 30 to 1000 seconds. In the present invention, since the coating layer including the polymer binder and the inorganic particles on one surface or both surfaces of the microporous polyolefin film, the coating layer blocks pores of the existing microporous polyolefin film, such that permeability may be reduced. Particularly, in the case in which gas permeability of the microporous polyolefin composite film is more than 1000 seconds, even though the microporous polyolefin composite film has high heat resistance, since battery output characteristics and battery cycle characteristics may be significantly reduced, the battery is not efficient, and in the case in which gas permeability is less than 30 seconds, porosity and permeability of the microporous polyolefin composite film are excessively high, which may have a negative influence on stability of the battery. In the present invention, it may be appreciated that the range of the permeability (Gurley) in which the battery is most stable and behavior of the battery is not hindered is 30 to 1000 seconds.

Further, the above-mentioned microporous polyolefin composite film according to the present invention may be adhered to the electrode by heat sealing to form an electro-chemical device, where the electro-chemical device may be independently formed, or a plurality of electro-chemical devices may be stacked, in order to implement high capacitance and high output characteristics.

A method for manufacturing a microporous polyolefin composite film according to the present invention, the method includes:

(a) manufacturing a microporous polyolefin film;

(b) preparing a coating solution including a polymer binder and inorganic particles;

(c) applying the coating solution prepared in step (b) on one surface of the microporous polyolefin film manufactured in step (a) except for the portion of the edge of the microporous polyolefin film; and (d) heat sealing a portion of an edge of the microporous film.

Here, in step (a), the microporous polyolefin film may be manufactured, for example, through the follow steps (a1) to (a5), but may be manufactured by any method known in the art.

The method for the microporous polyolefin film includes:

(a1) melting/kneading/extruding a mixture containing 20 to 50 wt % of polyethylene having a weight average molecular weight of $2.0 \times 10^5$ to $4.5 \times 10^5$ and 50 to 80 wt % of diluents at phase separation temperature or more to form a thermodynamic single phase in an extruder;

(a2) carrying out phase separation of the melting in a single phase and forming it into a sheet;

(a3) stretching the sheet manufactured in step (a2) at a stretching ratio of 3.0 times or more in transverse and machine directions, respectively;

(a4) extracting the diluent from the stretched film in a state in which predetermined tension force is applied thereto, and then drying the film; and (a5) heat-setting step of removing residual stress, or the like, from the dried film to reduce a shrinkage ratio of the film.

Through the above mentioned steps (b), (c), and (d), the coating layer including the polymer binder and the inorganic particles is formed on one surfaces or both surfaces of the microporous polyolefin film manufactured as described above. In the present invention, the microporous polyolefin film having the coating layer formed thereon as described above is referred to as a microporous polyolefin composite film.

Step (b), which is a step of preparing the coating solution including the polymer binder and the inorganic particles, may be carried out by dispersing the inorganic particles in a solvent to prepare inorganic particle dispersion solution, and then mixing the prepared inorganic particle dispersion solution with the polymer binder. Any solvent that may disperse the inorganic particles may be used without limitation, and dispersion may be performed by a generally known method such as ultrasonic dispersion, bead mill, jet mill, basket mill, or the like. As a method of mixing the inorganic particle dispersion solution and the polymer binder with each other, various methods known in the art such as a mixer may be used.

Step (c) is a step of applying the coating solution prepared in step (b) on one surface or both surfaces of the microporous polyolefin film manufactured in step (a) except for the portion of the edge of the microporous polyolefin film.

In the present invention, as a method for applying the coating solution in step (c) to the microporous polyolefin film, any method widely known in the art may be used without limitation. For example, a bar coating method, a rod coating method, a die coating method, a wire coating method, a comma coating method, a micro gravure/gravure method, a dip coating method, a spray method, an ink-jet coating method, a mixing method thereof, a modified method thereof, or the like, may be used, and preferably, a stripe die coating method, a micro gravure method having a pattern (stripe), or bar and wire coating method may be used. Next, a process of planarizing or partially removing the coating layer of the surface using a doctor blade, an air knife, a bar, or the like, may be performed. In a coating layer applied to one surface or both surfaces of a base layer such as the microporous polyolefin film, or the like, a step of removing a solvent through a drying process at predetermined temperature and humidity may be performed, wherein the drying method is not particularly limited. For example, an air blowing method, an infrared heating method, an ultraviolet curing method, or the like, may be used alone, or a combination thereof may be used.

Step (d) is a step of heat sealing the portion of the edge of the microporous polyolefin film, and in this case, the heat sealed portion may have a width of 0.5 to 50 mm form the edge line of the microporous film. In the case in which the width of the heat sealed portion is narrow than 0.5 mm, the heat sealed portion is excessively narrow, heat sealing process defects may be generated, and although the heat sealing is normally carried out, the fused portion may be torn. In addition, in the case in which the width of the heat sealing section is wider than 50 mm, since the area of the electrode plate should be reduced corresponding thereto, a ratio of capacitance to volume may be significantly reduced.

Further, a heat sealing temperature may be 140 to 280° C., a heat sealing time may be 1 to 20 seconds, and a heat sealing pressure may be 0.1 to 2 MPa. In the case in which the heat sealing temperature is lower than 140° C. or the heat sealing time is shorter than 1 second, thermal energy is insufficient, such that microporous polyolefin film may not be melted and thus the fusion may be difficult. Further, in the case in which the heat sealing temperature is higher than 280° C., the microporous polyolefin film or the aluminum pouch may be thermally deformed, warpage of the battery may be generated, and fracture may be generated in the case of the microporous polyolefin film. A time required for heat sealing is determined according to the heat sealing temperature and materials and thicknesses of the aluminum pouch and the microporous film and is not particularly limited, but generally, in the case in which the time is longer than 20 seconds, since the manufacturing time and cost may be excessively increased, the heat sealing time may be preferably 1 to 20 seconds. Further, in the case in which the heat sealing pressure is lower than 0.1 MPa, the heat sealed portion may be non-uniform, and the heat sealing pressure is higher than 2 MPa, the aluminum pouch and the microporous film may be deformed.

Properties of the microporous polyolefin film according to the present invention were evaluated according to the following test methods, and the results were shown in the following Table 2.

(1) Thickness

As a thickness gauge of contact type, having the precision of 0.1 μm, TESA-μHITE product was used.

(2) Thickness of Coating Layer

When the coating layer was formed on a surface of the microporous polyolefin film, thicknesses of the microporous polyolefin film before and after coating were measured, and a thickness of the coating layer was calculated by a difference between the thicknesses thereof. In addition, cross-section was cut by microtoming, and the cross-section was observed by means of an electron microscopy to measure the thickness.

(3) Particle Size

The particle size was analyzed using 53500 (Microtrac Co.) capable of analyzing a particle having a size of 0.02 to 2,000 μm using laser diffraction analysis. As needed, the particle size was measured from an electron microscope photograph of a surface of the film.

(4) Gas Permeability (Gurley)

The gas permeability was measured using a Gurley densometer (G-B2C, Toyoseiki Co.) according to JIS P8117, which is one of the Japanese industrial standards. When predetermined pressure (0.05 kg/cm$^2$) was applied between upper and lower surfaces of the microporous film, a time (second) required for passing all of the dried air (100 cc) through a predetermined area (1 inch$^2$) of the microporous film was measured.

(5) Shrinkage Ratio

A sample obtained by cutting the microporous polyolefin composite film into a square of which one side has a length of 10 cm was prepared, and positions was marked by an interval of 2 cm in vertical and horizontal directions. 11 cm square shaped Teflon sheet paper was disposed on each of the upper and lower surfaces of the square shaped microporous film sample. Glass plates were disposed on upper and lower surfaces of the Teflon sheet paper, and then a glass plate was pressed so that force (7.5 mg/mm$^2$) was applied to the entire surfaces of the sample. After the sample pressed by the glass plate was released at 160° C. for 1 hour, shrinkage in machine and transverse directions were measured, thereby calculating a final area shrinkage ratio (%).

(6) Melt Fracture Temperature

The melt fracture temperature of the microporous polyolefin composite film was measured in a simplified cell of which impedance may be measured. The simplified cell was manufactured by positioning the microporous polyolefin composite film between two graphite electrode plates to be assembled and then injecting an electrolyte solution thereinto, AC electric resistance was measured at 1 kHz while a temperature of the cell was raised from 25° C. to 200° C. by 5° C./min. Resistance of the normally assembled cell at 25°

C. should be 10Ω or less, a temperature of a point at which the resistance rapidly increased at least ten times larger than an initial value was considered as close temperature, and a temperature of a point at which the resistance again decreased to 10Ω or less was considered as the melt fracture temperature. As the electrolyte solution, a solution obtained by dissolving lithium hexa-flurophophate ($LiPF_6$) in ethylene carbonate and propylene carbonate (1:1) solution at a concentration of 1 mole was used.

(7) Adhesive Force

The adhesive force was measured using UTM 3345 (INSTRON Co.) and a jig for measurement was configured of upper and lower plates that is made of a metal material and flat in a horizontal direction. Powerful double sided tape (3M Co.) was adhered to the upper and lower plates, the microporous composite film was disposed between the upper and lower plates, the microporous composite film was firstly adhered to the lower plate, and then the upper plate was gradually lowered to thereby adhere to the microporous composite film at pressure of 1 MPa. Force when the upper plate was pulled at a rate of 250 mm/min in a state in which the lower plate was fixed was measured, and the adhesive force was calculated from the measured value according to the following Calculation Equation.

Adhesive force[$Kg_f/cm^2$]=measured value/area of tape used in upper plate[$cm^2$]  [Calculation Equation]

(8) Measurement of Molecular Weight of Polymer

The molecular weight of the polymer was measured using 1,2,4-trichlorobenzene (TCB) as a solvent at 140° C. by high temperature gel permeation chromatography (GPC, Polymer Lab.), and as a reference sample for measuring a molecular weight, polystyrene was used.

(9) Vibration Test of Secondary Battery

The secondary battery was fully charged so that state of charge (SOC) becomes 100%, and then disposed on a vibration tester. The vibration test was set so as to have amplitude of 0.8 mm in horizontal, vertical, and height directions, a frequency of 10 to 55 Hz, and a frequency change rate of 1 Hz/min and then vibration was applied for 90 minutes. When voltage and resistance of the battery of which test was finished were compared with those before the test, in the case in which a difference is included in a range of ±1% and damage of the battery or leaked liquid was not present, the result was shown as "O", otherwise, the result was shown as "X".

(10) Thermal Exposure Test of Secondary Battery

After the secondary battery was fully charged so that state of charge (SOC) becomes 100%, and the secondary battery was put into an oven and heated. A temperature of the oven was set so as to increase to 150° C. at a rate of 5° C./min and maintain a temperature of 150° C. for 30 minutes. In the case in which the secondary battery was not ignited or ruptured until the test was finished, the result was shown as "O", and in the case in which the secondary battery was ignited or ruptured, the result was shown "X".

Example 1

Manufacturing Microporous Polyolefin Film

As a polyolefin resin, high density polyethylene having a weight average molecular weight of $3.8 \times 10^5$ and a melting point of 135° C. was used, and as a diluent, paraffin oil having kinematic viscosity of 160 cSt at 40° C., contents of the polyethylene and the diluent were 30 wt % and 70 wt %, respectively. The composition was extruded at 240° C. using a bi-axial compounder mounted with a T-die, passed through a section set to 170° C. to generate phase separation between the polyethylene and the diluent that are present as a single phase, and a sheet was manufactured using a casting roll. The manufactured sheet was stretched 6 times in each of the machine and transverse directions at a stretching temperature of 128° C. using a two-step biaxial stretching machine, the stretched film was immersed in methylenechloride at 30° C. to extract the diluent. Heat treatment process was performed at 128° C. in a sequence of a heat setting step, a heat stretching step, and heat relaxation step, and in each step, a width of the film was increased and decreased 1 time, 1.2 times, and 1.1 times, respectively, than an original width. Finally, a microporous polyethylene film having a width of 1000 mm and a length of 500 mm was obtained in a roll state, wherein a final thickness thereof was 16 μm, air permeability (Gurley) was 130 seconds, and a melt fracture temperature was 152° C.

Manufacturing Microporous Polyolefin Composite Film 2 wt % of polyvinyl alcohol having a melting point of 220° C., 2 wt % of acryl latex having a glass transition temperature of −45° C., 46 wt % of alumina having an particle size of 0.5 μm were dissolve in 50 wt % of distilled water, thereby preparing a coating solution. The coating solution was applied on one surface of the manufactured microporous polyethylene film by a die coating method, wherein a die was adjusted so that a coated portion having a width of 104 mm and an uncoated portion having a width of 10 mm were alternately disposed to form a stripe pattern (See FIG. 3). The coated microporous film was dried while passing through a drier discharging hot air (60° C.) and having a length of 6 m at a rate of 5 m/min and then wound in a roll shape. Hereinafter, coating conditions were shown in Table 1, and properties of the finally obtained microporous polyolefin composite film were shown in Table 2.

Manufacturing Cathode Plate

A cathode active material ($LiCoO_2$), carbon black, which is a conductive material, and polyvinylidene fluoride, which is a binder, were dispersed at a ratio of 95:2:3 by weight in n-methyl-2-pyrrolidone (NMP) to prepare slurry, the prepared slurry was coated on an aluminum foil and dried at 120° C. Then, finally, a cathode plate having a thickness of 107 μm was manufactured through a pressing process.

Manufacturing Anode Plate

An anode active material (graphite), carbon black, which is a conductive material, and polyvinylidene fluoride, which is a binder, were dispersed at a ratio of 90:7:3 by weight in NMP to prepare slurry, the prepared slurry was coated on a copper foil and dried at 120° C. Then, finally, an anode plate having a thickness of 130 μm was manufactured through a pressing process.

Manufacturing Stack Cell

The manufactured cathode plate was cut into a rectangle having (80 mm×100 mm) except for a tap portion, and the anode plate was cut into a rectangle having (82 mm×102 mm) except for a tap portion. The microporous polyolefin composite film was slit into a roll having a width of 114 mm and including uncoated portions formed at a width of 5 mm at both sides of a coated portion having a width of 104 mm. The microporous polyolefin composite film was unfolded in a horizontal direction, one anode plate was disposed thereon, the microporous polyolefin composite film was folded and disposed on the anode plate, one cathode plate was again disposed thereon, and again the microporous polyolefin composite film was folded and disposed on the cathode plate. The anode and cathode plates were alternately stacked between the microporous film by repeatedly performing these processes.

The microporous film was folded at a width of 84 mm, such that the microporous film was spaced apart from a left edge line of the anode plate and a right edge line of the cathode by 1 mm, respectively. In addition, the anode plate was disposed on an accurate center of the cathode, and the uppermost and lowermost electrode plates were anode plates. The number of anode plates used to form a single cell was 6, the number of cathode plates used to form a single cell was 5, and the number of stacked microporous polyolefin composite films was 12.

Heat Sealing and Manufacturing Secondary Battery

The manufactured stack cell was inserted into an aluminum pouch, and an edge portion except for an electrolyte solution injection part was heat sealed. Then, an electrolyte solution injector was connected to the electrolyte solution injection part of the aluminum pouch. After air in the pouch was removed through the injector, the electrolyte solution was injected, and after injection of the electrolyte solution was completed, the electrolyte solution injection part was heat sealed, thereby completely sealing the aluminum pouch. The heat sealing was performed by heating upper and lower metal plates at 180° C., disposing the aluminum pouch between the upper and lower metal plates, and applying pressure (0.5 MPa) thereto for 5 seconds. Hereinafter, heat sealing conditions were shown in Table 1. In this case, the heat sealed portion had an internal space of 86 mm×106 mm and was spaced apart outwardly from the edge line of the anode plate by 2 mm, and a width of the heat sealed portion of the aluminum pouch was 10 mm. Here, widths of upper and lower portions at which the aluminum pouch and the microporous composite film were heat sealed together with each other were 4 mm, respectively. In the injected electrolyte solution, lithium hexa-flurophophate ($LiPF_6$) was dissolved therein at a concentration of 1 mole, and ethylene carbonate (EC) and ethyl methyl carbonate (EMC) were dissolved at a ratio of 3:7 by weight.

Example 2

A cathode plate, an anode plate, and a microporous polyolefin composite film were manufactured by the method in Example 1. Here, a die was adjusted so that a coated portion having a width of 104 mm and an uncoated portion having a width of 10 mm were alternately disposed to form a stripe pattern (See FIG. 3). The coated microporous film was dried while passing through a drier discharging hot air (60° C.) and having a length of 6 m at a rate of 5 m/min and then wound in a roll shape. Physical properties of the finally obtained microporous polyolefin composite film were shown in Table 2.

Unlike Example 1, the microporous polyolefin film for manufacturing a stack cell was slit so as to have a width of 108 mm (width of a coated portion: 104 mm, widths of both uncoated portions: 2 mm), such that a portion of the microporous polyolefin composite film heat sealed together with an aluminum pouch had a width of 1 mm. Except for the above condition, a secondary battery was manufactured by the same method as in Example 1.

Example 3

A cathode plate and an anode plate were manufactured by the method in Example 1, and a coating solution was prepared by dissolving 3.7 wt % of polyacrylate having a melting point of 201° C. and 26.8 wt % of alumina having an average particle size of 1.5 μm in 69.5 wt % of tetrahydrofuran (THF). The coating solution was applied to one surface of the manufactured microporous polyethylene film by a die coating method. A die was adjusted so that a coated portion had a width of 104 mm and an uncoated portion had a width of 82 mm, and subsequent drying conditions were the same as those in Example 1. The microporous polyolefin composite film for manufacturing a stack cell was slit into a roll having a width of 186 mm and including uncoated portions formed at a width of 41 mm at both sides of a coated portion having a width of 104 mm. A stack cell was manufactured using the cathode plate and the anode plate that were manufactured by the method in Example 1 and heat sealed such that a portion of the microporous polyolefin composite film heat sealed together with an aluminum pouch had a width of 40 mm. Subsequent processes were performed by the same method as in Example 1, thereby manufacturing a secondary battery.

Example 4

The stack cell manufactured by the method in Example 3 was put into an aluminum pouch and heat sealed. At the time of heat sealing, a heating temperature of upper and lower plates was 145° C., and pressure (0.5 MPa) was applied for 15 seconds. Except for the above condition, a secondary battery was manufactured by the same method as in Example 3.

Example 5

The stack cell manufactured by the method in Example 3 was put into an aluminum pouch and heat sealed. At the time of heat sealing, a heating temperature of upper and lower plates was 270° C., and pressure (0.5 MPa) was applied for 1.5 seconds. Except for the above condition, a secondary battery was manufactured by the same method as in Example 3.

Comparative Example 1

A secondary battery was manufactured by the same method as in Example 1 except that the microporous polyethylene film manufactured by the method in Example 1 was used in a state in which it was not coated.

Comparative Example 2

A microporous polyolefin composite film, a cathode plate, and an anode plate were manufactured by the method in Example 1. Unlike Example 1, the microporous polyolefin film for manufacturing a stack cell was slit so as to have a width of 105 mm (width of a coated portion: 104 mm, widths of both uncoated portions: 0.5 mm), and then the microporous polyolefin composite film was not heat sealed but only an aluminum pouch was heat sealed. Except for the above condition, a secondary battery was manufactured by the same method as in Example 1.

Comparative Example 3

A microporous polyolefin composite film, a cathode plate, and an anode plate were manufactured by the method in Example 1. Unlike Example 1, the microporous polyolefin film for manufacturing a stack cell was slit so as to have a width of 106.6 mm (width of a coated portion: 104 mm, widths of both uncoated portions: 1.3 mm), such that a portion of the microporous polyolefin composite film heat sealed together with an aluminum pouch had a width of 0.3 mm. Except for the above condition, a secondary battery was manufactured by the same method as in Example 1.

Comparative Example 4

A microporous polyethylene film and a coating solution were manufactured by the method in Example 1. The coating solution was applied in a state in which a die was adjusted so that a coated portion had a width of 90 mm and an uncoated portion had a width of 24 mm, and subsequent drying conditions were the same as those in Example 1. The microporous polyolefin composite film for manufacturing a stack cell was slit into a roll having a width of 116 mm and including uncoated portions formed at a width of 12 mm at both sides of a coated portion having a width of 90 mm. Subsequent processes were performed by the same method as in Example 1, thereby manufacturing a secondary battery. As a result, both distal ends of the anode plate in a vertical direction contacted uncoated portions of the microporous polyolefin composite film at a width of 6 mm, respectively.

Comparative Example 5

The stack cell manufactured by the method in Example 3 was put into an aluminum pouch and heat sealed. At the time of heat sealing, a heating temperature of upper and lower plates was 135° C., and pressure (0.5 MPa) was applied for 25 seconds. Except for the above condition, a secondary battery was manufactured by the same method as in Example 3.

Comparative Example 6

The stack cell manufactured by the method in Example 3 was put into an aluminum pouch and heat sealed. At the time of heat sealing, a heating temperature of upper and lower plates was 270° C., and pressure (0.5 MPa) was applied for 0.5 seconds. Except for the above condition, a secondary battery was manufactured by the same method as in Example 3.

Comparative Example 7

A cathode plate and an anode plate were manufactured by the method in Example 1, and a coating solution was prepared by dissolving 2.2 wt % of polyvinylidenefluoride-hexafluoropropylene (PVDF-HFP) having a melting point of 160° C. and 25.7 wt % of alumina having an average particle size of 0.5 μm in 72.1 wt % of acetone. The coating solution was applied to one surface of the manufactured microporous polyethylene film by a die coating method. A die was adjusted so that a coated portion had a width of 104 mm and an uncoated portion had a width of 82 mm, and subsequent drying conditions were the same as those in Example 1. The microporous polyolefin composite film for manufacturing a stack cell was slit into a roll having a width of 186 mm and including uncoated portions formed at a width of 41 mm at both sides of a coated portion having a width of 104 mm. A stack cell was manufactured using the cathode plate and the anode plate that were manufactured by the method in Example 1 and heat sealed such that a portion of the microporous polyolefin composite film heat sealed together with an aluminum pouch had a width of 40 mm. Subsequent processes were performed by the same method as in Example 1, thereby manufacturing a secondary battery.

TABLE 1

| | Main category | | | |
|---|---|---|---|---|
| | Coating condition | Heat sealing condition | | |
| | Subcategory | | | |
| | Area ratio of coating layer to anode (%) | Width of heat sealing portion of microporous film (mm) | Heat sealing temperature (° C.) | Heat sealing time (second) |
| Example 1 | 104 | 4 | 180 | 5 |
| Example 2 | 104 | 1 | 180 | 5 |
| Example 3 | 104 | 40 | 180 | 5 |
| Example 4 | 104 | 40 | 145 | 15 |
| Example 5 | 104 | 40 | 270 | 1.5 |
| Comparative Example 1 | 0 | 4 | 180 | 5 |
| Comparative Example 2 | 104 | 0 | 180 | 5 |
| Comparative Example 3 | 104 | 0.3 | 180 | 5 |
| Comparative Example 4 | 90 | 4 | 180 | 5 |
| Comparative Example 5 | 104 | 40 | 135 | 25 |
| Comparative Example 6 | 104 | 40 | 270 | 0.5 |
| Comparative Example 7 | 104 | 40 | 180 | 5 |

TABLE 2

| | Main category | | | | | | |
|---|---|---|---|---|---|---|---|
| | Physical properties of microporous composite film | | | | | Test results of secondary battery | |
| | Sub category | | | | | | |
| | Permeability (sec/100 cc) | final thickness (μm) | shrinkage ratio at 160° C. (%) | adhesive force (Kg/cm²) | melt fracture temperature (° C.) | vibration test result | heat exposure result |
| Example 1 | 170 | 21 | 6 | 2.5 | >200 | ○ | ○ |
| Example 2 | 170 | 21 | 6 | 2.5 | 193 | ○ | ○ |
| Example 3 | 490 | 21 | 3 | 1.1 | >200 | ○ | ○ |
| Example 4 | 170 | 21 | 6 | 2.5 | >200 | ○ | ○ |
| Example 5 | 170 | 21 | 6 | 2.5 | >200 | ○ | ○ |
| Comparative Example 1 | 130 | 16 | 78 | — | 153 | ○ | X |

TABLE 2-continued

| | Physical properties of microporous composite film | | | | Test results of secondary battery | |
|---|---|---|---|---|---|---|
| | Permeability (sec/100 cc) | final thickness (μm) | shrinkage ratio at 160° C. (%) | adhesive force (Kg$_f$/cm$^2$) | melt fracture temperature (° C.) | vibration test result | heat exposure result |
| Comparative Example 2 | 170 | 21 | 6 | 2.5 | >200 | X | ○ |
| Comparative Example 3 | 170 | 21 | 6 | 2.5 | >200 | X | ○ |
| Comparative Example 4 | 170 | 21 | 6 | 2.5 | >200 | ○ | X |
| Comparative Example 5 | 170 | 21 | 6 | 2.5 | >200 | X | ○ |
| Comparative Example 6 | 170 | 21 | 6 | 2.5 | >200 | X | ○ |
| Comparative Example 7 | 260 | 21 | 36 | 0.6 | 157 | ○ | X |

The invention claimed is:

1. A microporous polyolefin composite film comprising a coating layer including a polymer binder and inorganic particles on one surface or both surfaces of a microporous polyolefin film,
   wherein the coating layer is formed to be spaced apart from an edge line of the single-layered microporous polyolefin film by a predetermined width, and a portion of the spaced portion is heat sealed, and
   wherein the composite film has a shrinkage ratio of 10% or less at 160° C. and a melt fracture temperature of 190° C. or more, adhesion between the coating layer and the single-layered microporous polyolefin film is 1.0 Kg$_f$/cm$^2$ or more, and permeability (Gurley) is 30 to 1000 seconds.

2. The microporous polyolefin composite film of claim 1, wherein an area of the coating layer is 100% to 150% of an area of an anode plate, and a width of the heat sealing section is 0.5 to 50 mm from the edge line of the microporous polyolefin film.

3. The microporous polyolefin composite film of claim 1, wherein a heat sealing temperature is 140 to 280° C., a heat sealing time is 1 to 20 seconds, and a heat sealing pressure is 0.1 to 2 MPa.

4. A method for manufacturing a microporous polyolefin composite film of claim 1 comprising:
   (a) manufacturing a single-layered microporous polyolefin film;
   (b) preparing a coating solution including a polymer binder and inorganic particles;
   (c) applying the coating solution prepared in step (b) on one surface of the single-layered microporous polyolefin film manufactured in step (a) except for a portion of an edge of the single-layered microporous polyolefin film; and
   (d) heat sealing the portion of the edge of the microporous film.

5. An electro-chemical device in which an electrode and the microporous polyolefin composite film of claim 1 contacting the electrode are adhered to each other by heat sealing.

6. The electro-chemical device of claim 5, which is independently formed.

7. The electro-chemical device of claim 5, wherein a plurality of electro-chemical devices are stacked.

* * * * *